(12) United States Patent
Maurer et al.

(10) Patent No.: US 10,926,202 B2
(45) Date of Patent: Feb. 23, 2021

(54) FILTER DEVICE WITH COUPLING ELEMENT

(71) Applicant: HYDAC FILTERTECHNIK GMBH, Sulzbach/Saar (DE)

(72) Inventors: Patrick Maurer, Sulzbach (DE); Stefan Hennes, Hangard (DE); Michael Sakraschinsky, St. Ingbert (DE)

(73) Assignee: HYDAC FILTERTECHNIK GMBH, Sulzbach/Saar (DE)

( * ) Notice: Subject to any disclaimer, the term of this patent is extended or adjusted under 35 U.S.C. 154(b) by 328 days.

(21) Appl. No.: 15/760,264

(22) PCT Filed: Aug. 13, 2016

(86) PCT No.: PCT/EP2016/001393
§ 371 (c)(1),
(2) Date: Mar. 15, 2018

(87) PCT Pub. No.: WO2017/050412
PCT Pub. Date: Mar. 30, 2017

(65) Prior Publication Data
US 2018/0257012 A1   Sep. 13, 2018

(30) Foreign Application Priority Data
Sep. 25, 2015 (DE) .................. 10 2015 012 558.3

(51) Int. Cl.
*B01D 27/08* (2006.01)
*B01D 29/96* (2006.01)
(Continued)

(52) U.S. Cl.
CPC ............ *B01D 29/96* (2013.01); *B01D 27/08* (2013.01); *B01D 29/21* (2013.01); *B01D 35/14* (2013.01);
(Continued)

(58) Field of Classification Search
CPC .................. B01D 29/96; B01D 29/21; B01D 2201/4061; B01D 2265/025;
(Continued)

(56) References Cited

U.S. PATENT DOCUMENTS

| 6,251,273 B1 | 6/2001 | Jawurek et al. |
| 2012/0031828 A1 | 2/2012 | van Savooijen et al. |
| 2012/0261323 A1* | 10/2012 | Badeau ............... B01L 335/30 210/232 |

FOREIGN PATENT DOCUMENTS

| DE | 197 07 132 | 8/1998 |
| DE | 10 2005 026 292 | 12/2006 |

(Continued)

OTHER PUBLICATIONS

International Search Report (ISR) dated Nov. 23, 2016 in International (PCT) Application No. PCT/EP2016/001393.

*Primary Examiner* — Angel Olivera
(74) *Attorney, Agent, or Firm* — Wenderoth, Lind & Ponack, L.L.P.

(57) ABSTRACT

A filter device has a filter element (1) received in a filter housing of at least two interconnectable housing parts (17, 19). The filter element (1) can be fixed to a housing part (19) in a removable manner by one screw connection (32, 33). An additional screw connection (17, 41) is provided for connecting the housing parts (17, 19). To transmit a torque between threaded elements (33) of the one screw connection (32, 33) and of the additional screw connection (41), the threaded elements are rotatable relative to each other. A coupling device (43, 46, 61) is added that allows an additional rotational movement of the threaded element (17) of the additional screw connection (41) when the threaded element (33) of the one screw connection (32, 33) reaches the fixed rotational state.

17 Claims, 6 Drawing Sheets

(51) Int. Cl.
  *B01D 35/30* (2006.01)
  *B01D 29/21* (2006.01)
  *B01D 35/14* (2006.01)
  *B01D 35/00* (2006.01)

(52) U.S. Cl.
  CPC ............ *B01D 35/30* (2013.01); *B01D 35/306* (2013.01); *B01D 35/005* (2013.01); *B01D 2201/291* (2013.01); *B01D 2201/295* (2013.01); *B01D 2201/301* (2013.01); *B01D 2201/302* (2013.01); *B01D 2201/305* (2013.01); *B01D 2201/306* (2013.01); *B01D 2201/40* (2013.01); *B01D 2201/4007* (2013.01); *B01D 2201/4023* (2013.01); *B01D 2201/4061* (2013.01); *B01D 2201/4076* (2013.01); *B01D 2201/4084* (2013.01); *B01D 2201/4092* (2013.01); *B01D 2265/025* (2013.01)

(58) Field of Classification Search
  CPC .......... B01D 2201/291; B01D 2201/40; B01D 2201/4092; B01D 2201/295; B01D 2201/4007; B01D 2201/301; B01D 2201/302; B01D 2201/305; B01D 2201/4023; B01D 2201/4076; B01D 2201/4084; B01D 27/08; B01D 35/005; B01D 35/14; B01D 35/30; B01D 35/306; B01D 2201/306
  See application file for complete search history.

(56) References Cited

FOREIGN PATENT DOCUMENTS

| | | | | |
|---|---|---|---|---|
| DE | 10 2011 120 680 | 6/2013 | | |
| EP | 1 714 687 | 10/2006 | | |
| EP | 1 731 210 | 12/2006 | | |
| EP | 1731210 A1 | * 12/2006 | ............ | B01D 29/21 |
| WO | 2010/123344 | 10/2010 | | |
| WO | 2015/092523 | 6/2015 | | |

* cited by examiner

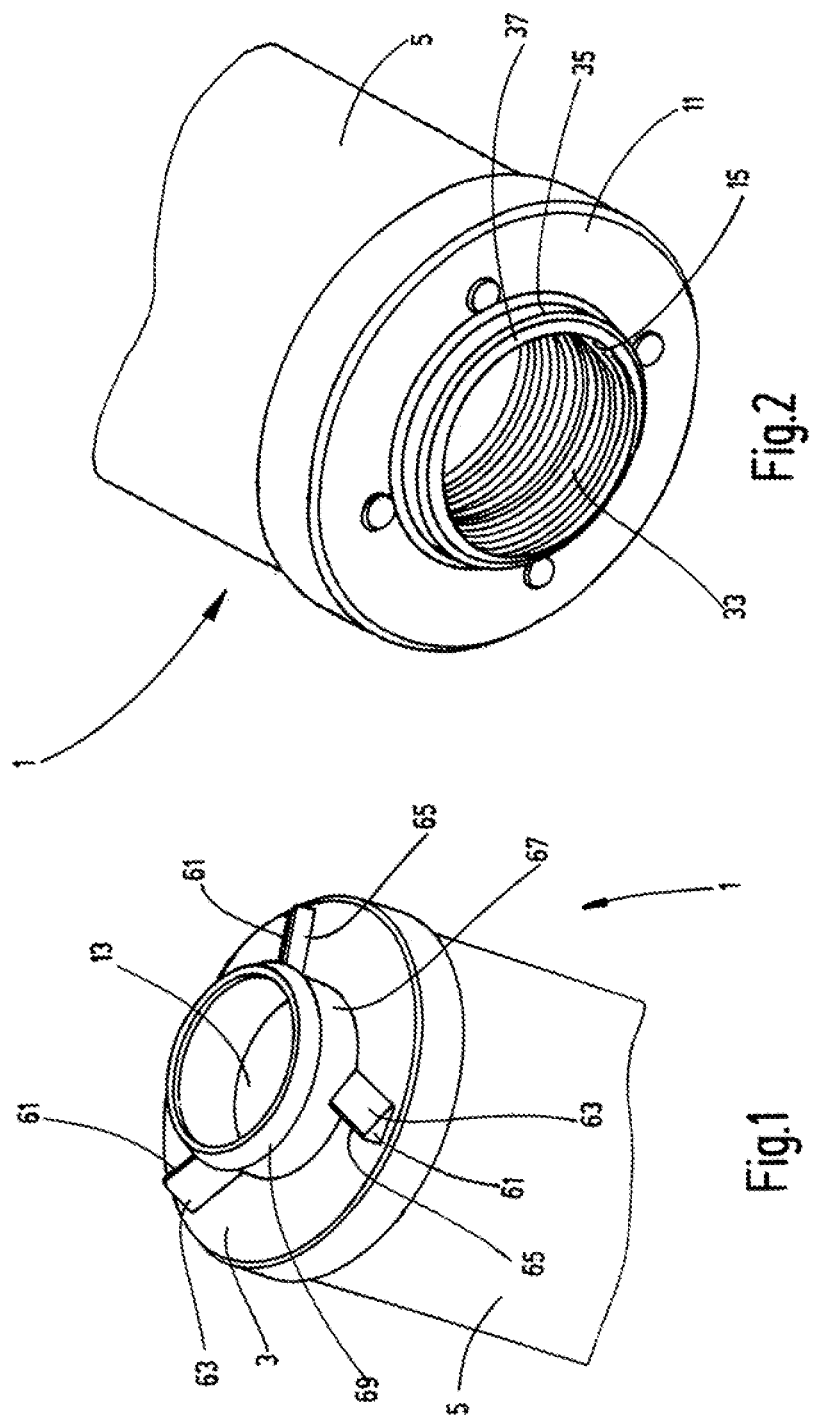

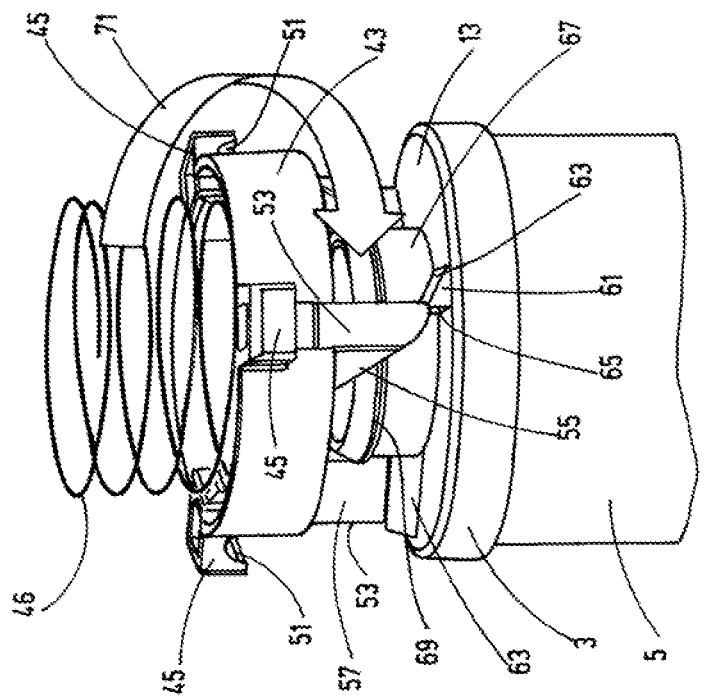
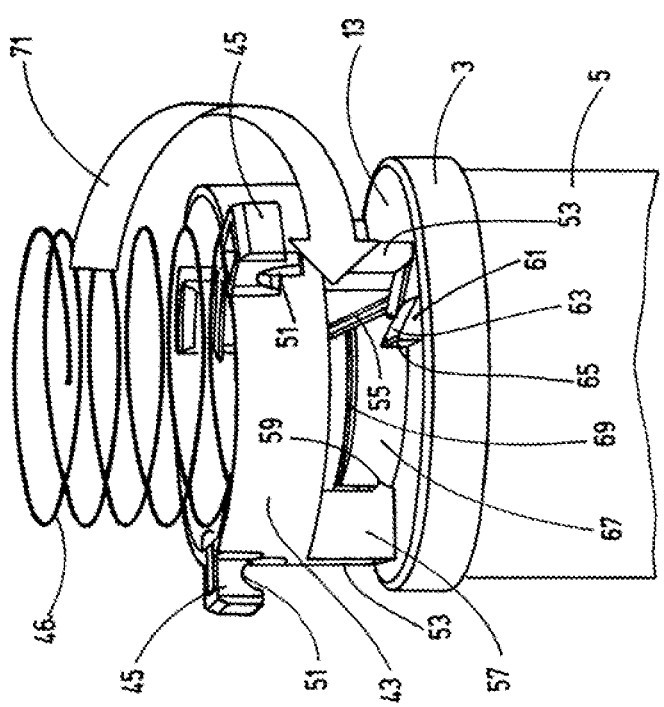

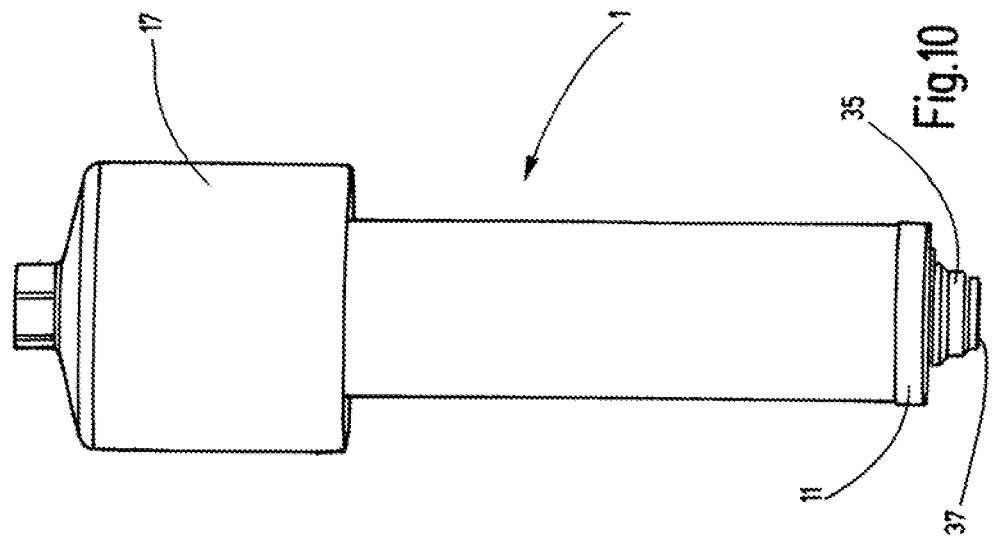
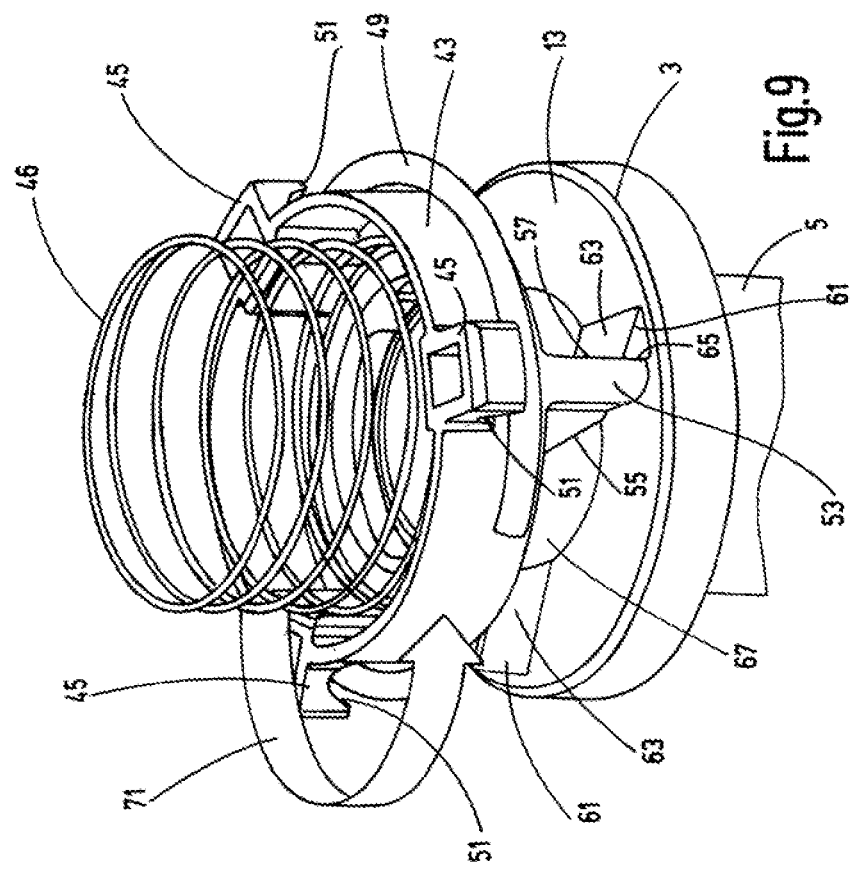

FILTER DEVICE WITH COUPLING ELEMENT

FIELD OF THE INVENTION

The invention relates to a filter device having a filter element, which can be mounted in a filter housing. The filter housing has at least two interconnected housing parts. The filter element can be detachably attached to a housing part by a first screw connection. A second screw connection is provided for connecting the housing parts.

BACKGROUND OF THE INVENTION

Filter devices having at least one filter element, which can be mounted in a housing, through which at a certain system pressure or fluid operating pressure fluids can flow are state of the art and are widely used, for instance, in system branches of hydraulic systems through which hydraulic oil flows. A filter device of the type mentioned, in which the filter element can be connected to a housing part by a screw connection and in which the housing parts forming the housing of the device can also be connected to one another by a screw connection, is disclosed in the document DE 10 2011 120 680 A1. In this known filter device, the filter element has an internal thread forming a threaded element of a screw connection at the opening of an end cap. This screw connection can be used to fasten the filter element to a housing head. The housing head forms a housing part of the overall housing of the housing head and the housing body or pot and has an external thread as a threaded element of screw connection with the filter element. The filter head can be screwed to the filter pot via a further screw connection.

The operational reliability of hydraulic systems in which such filter devices are used to filter the operating fluids used is highly dependent on the proper functioning of the filter devices. To prevent malfunctions that can result in damage to or failure of relevant hydraulic systems, careful maintenance of the filter devices is required. In particular, degraded filter elements have to be replaced by new filter elements. To enable efficient operation, it is essential that the maintenance, in particular the filter element replacement, can be performed quickly and safely. The known filter devices leave quite a bit to be desired in this respect. Even though the mentioned, known filter device is characterized by a favorable operating behavior insofar as the filter element is securely fixed in the filter housing by a screw connection, the maintenance is relatively time consuming, because for assembly and disassembly of the filter elements in question. In each case, two screw connections have to manipulated independently. For mounting "fresh filter elements", the screw connection on the filter head removed from the housing body has to be tightened. Thereafter the screw connection of the filter head to the filter pot is made. Correspondingly, two separate steps in the workflow are required for disassembly.

SUMMARY OF THE INVENTION

Based on this prior art, the invention addresses the problem of providing an improved filter device of the type described above, which is characterized by an improved ease of maintenance.

According to the invention, this object is basically achieved by a filter device having, as one essential feature of the invention, a coupling device inserted for transmitting a torque between threaded elements, rotatable in relation to one another, of the one and the other screw connection. The coupling device permits a further rotational movement of a threaded element of the other screw connection upon reaching the tightened state of a threaded element of the one screw connection. In this way, both screw connections can be actuated in a single operation, in which only one of the threaded elements is rotated by the maintenance person. By a single rotary actuation, both the tightened state between the filter element and the associated housing part and the tightened state of the housing parts among each other are attained, thereby significantly reducing the time required for maintenance.

The arrangement can advantageously be made in such a manner that the filter housing has a housing body, to which the threaded element of the first screw connection having a filter element can be attached by this screw connection. Additionally, a housing head, having a threaded element of the second screw connection, can be connected to the housing body by the second screw connection, as housing parts.

In particularly advantageous exemplary embodiments, the coupling device comprises two coupling parts. One coupling part is mounted in the housing head secured against rotation. The other coupling part is part of an end cap of the filter element, which end cap can be attached to the housing body. The one coupling part mounted in the housing head is movable in the axial direction of the screw connections. In this arrangement, the housing head associated to the coupling part forms the drive-end coupling part for actuating the screw connection between the filter element and the housing body during the rotational movement of the housing body, which the operator continues to perform for subsequent screwing of the housing body and the housing head. The coupling engagement with the coupling element located on the filter element is maintained during screwing because of the axial mobility of the one coupling part.

With particular advantage, the one coupling part allocated to the housing body may be formed as an annular driver element having at least one projecting driver cam. The driver cam has at its free end region a contact chamfer on one side and a limit stop on its other, opposite side.

In that case, the end cap may have, as part of the other coupling part, on its free front face at least one coupling wedge having on its one side a guide chamfer and on its other, opposite, side an abutment surface. In this design of the coupling device, it forms a kind of ratchet coupling, which transmits the torque exerted on the housing head by screwing due to the contact chamfer pushing the driving cams at the guide surfaces of the coupling wedges of the end cap, until the screw connection between the filter element and the housing body reaches the tightened state. Subsequently, the contact chamfer of the driving cams runs over the guide chamfer of the coupling wedges at the end cap, resulting in the housing head remaining rotatable until the tightened state of screwing the head on the housing body has been reached. For a disassembly conducted after the assembly, the coupling device acts as a rigid coupling, the rotational movement being performed in the opposite direction of rotation. The limit stops of the driver cams rest against the abutment surface of the coupling wedges after having overrun the coupling wedges. The coupling device then forms a kind of ratchet coupling between the drive-end coupling part (drive element) and the output side coupling part (coupling wedge at the end cap).

To adjust the strength of the torque transmitted by the coupling device before the contact chamfer of the driver cams overruns the guide chamfer of the relevant coupling wedge, the annular driver element can be guided in a longitudinally displaceable manner under the action of an energy storage, in particular in the form of a compression spring, in a receiving space of a housing part, such as the housing head, and can be held captive by a retaining device in the one housing part, such as the housing head. As a result of the spring stiffness of the pressure spring, the transmittable torque can be adjusted such that an excessive tightening of the screw connection at the filter element and any possible resulting damage to the associated sealing device are prevented. The torque can also be changed by the angle of the inclined planes of the contact chamfer and the guide chamfer. During the further rotational movement of the housing head in the course of the assembly process, the process of leap-frogging over the coupling parts continues until the screw connection connected to the drive-end coupling part and the connection of the housing body to the housing head have been tightened. In the process of dismantling where the direction of rotation is reversed, the coupling device acts as a torque-tight coupling as the contact chamfer of the driver cams rest against the abutment surface of the coupling wedges.

Advantageously, the relevant driver cam can have a snap tab on its side facing the center of the annular driver element, which snap tab can be used to latch the end cap to the driver element in forming a releasable clip connection. Assembly and disassembly are particularly convenient because the filter element, latched to the housing head, can be inserted into and removed from the housing body together with the housing head.

With respect to the retaining device, which is used to hold the driver element captive in the housing head, the retaining device may have a retaining hook preferably arranged on the relevant driver cam. The retaining hook protrudes outwards facing away from the center of the ring and comes into contact with a retaining ring stationarily fixed in the housing head as soon as the driver element has reached its lowermost travel position under the action of the energy storage.

In order to form a non-rotating axial guide for the driver element, the outwardly projecting retaining hook of the driver element can be guided in a longitudinally displaceable and non-rotating manner in a recess in the housing head or a component thereof.

In advantageous embodiments, three driver cams are arranged on the driver element. On the end cap, three coupling wedges are arranged diametrically opposite of the longitudinal axis of the filter element.

With respect to the formation of the screw connection connected to the coupling part at the output side, the arrangement may be such that during a rotational movement of the one housing part relative to the other, in particular when the housing head is screwed to the housing body, the coupling device drives the filter element such that its other free end can be screwed to a threaded connector of the other housing part, such as the housing body.

In order to ensure that the screw connection connected to the coupling part at the output side is tightened before the screw connection connected to the coupling part at the drive end has reached its tightened state, the threaded elements used may differ in their pitch and/or the number of turns. The filter element is then already fastened to the threaded connector of the housing body, before the housing head has been completely screwed on.

This design of the threaded elements ensures that, during screwing on, the contact chamfers of the relevant coupling wedge between the already tightened filter element and the complete screwing on of the housing head, on one end cap for a slipping coupling can run over each other. In the other direction of rotation during unscrewing, they may come into contact with the abutment surface of the relevant coupling wedge of the one end cap of the filter element for an engaged coupling device via the limit stop of the relevant driver cam.

Other objects, advantages and salient features of the present invention will become apparent from the following detailed description, which, taken in conjunction with the drawings, discloses a preferred embodiment of the present invention.

BRIEF DESCRIPTION OF THE DRAWINGS

Referring to the drawings that form a part of this disclosure:

FIGS. 1 and 2 a partial perspective view drawn in broken lines of the upper end region and the lower end region of a filter element provided for the filter device, respectively, according to an exemplary embodiment of the invention;

FIGS. 7 and 8 are partial perspective oblique views drawn in broken lines, showing different positions the coupling parts of the coupling device assume in the course of the assembly process, which assembly process is performed for mounting the filter element and for closing the filter housing;

FIG. 9 is a perspective view of the operating position of the coupling parts is shown during disassembly according to the exemplary embodiment; and FIG. 10 is a side view, drawn on a smaller scale, of the housing head removed from the housing body of the exemplary embodiment, with the filter element being secured thereto by a clip connection.

DETAILED DESCRIPTION OF THE INVENTION

Figure 3:
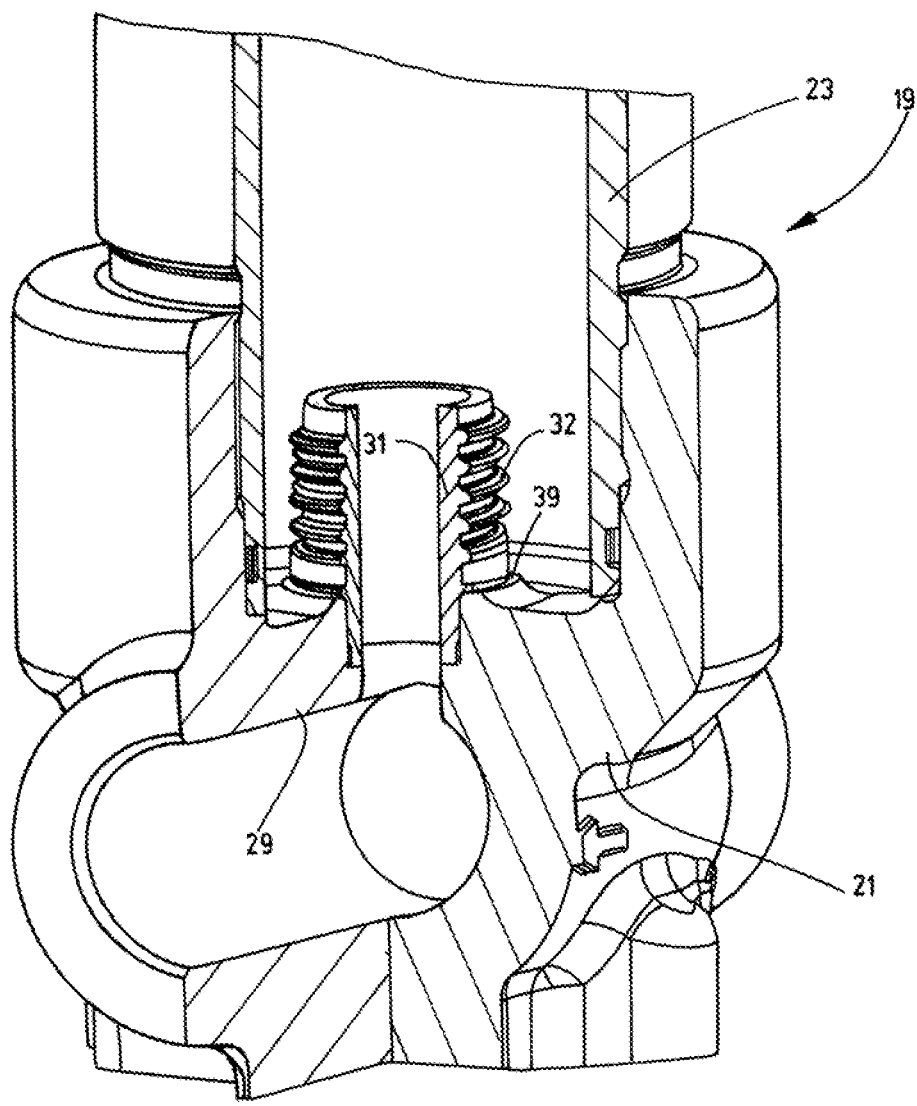
FIG. 3 is a partial perspective view in section at an angle and drawn in broken lines, of only the bottom region of a filter housing of a filter device according to the exemplary embodiment of the invention, without inserted filter element.

FIG. 1 shows only the upper end portion of a filter element 1, which is provided for use in the exemplary embodiment of the filter device according to the invention shown in the drawings. The filter element 1 formed in the manner of a replaceable filter cartridge has at its upper end, as shown in FIG. 1, an end cap 3. End cap 3 forms a border for the facing end of a filter medium 5 in the manner typical for such filter elements. The filter element preferably has several pleated layers and forms a hollow cylinder, which, cf. FIGS. 4 and 5, surrounds an inner filter cavity 7, in which a fluid-permeable support tube 9 is located. The support tube end facing the end cap 3 has been mounted in conjunction with the end of the filter medium 5 in the end cap 3. An end cap 11 is located at the lower end shown in FIG. 2, which lower end cap forms the enclosure for the facing end of the filter medium 5 and the support tube 9 in the same manner as the upper end cap 3. Unlike the upper end cap 3, which closes the inner filter cavity 7 at the upper end using a continuous, planar plate 13, the lower end cap 11 has a central opening 15. During the filtering process, in which the filter medium 5 can be traversed from the outside thereof towards the inner filter cavity 7, the filtered filtrate exits from the filter element 1 through the opening 15.

Figure 4:
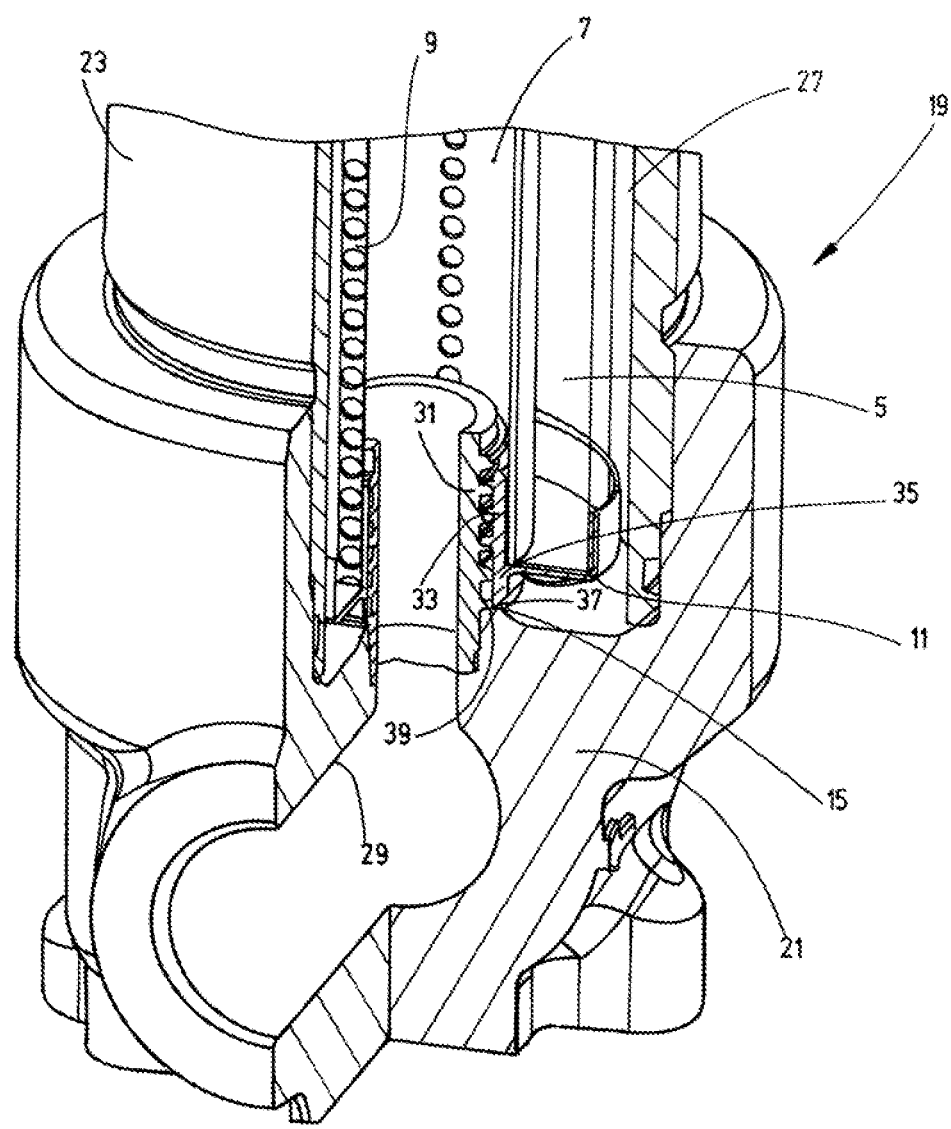
FIG. 4 is a partial perspective view in partial section with the filter element shown in FIGS. 1 and 2 located in the filter housing of FIG. 3 in the operational position.
Figure 5:
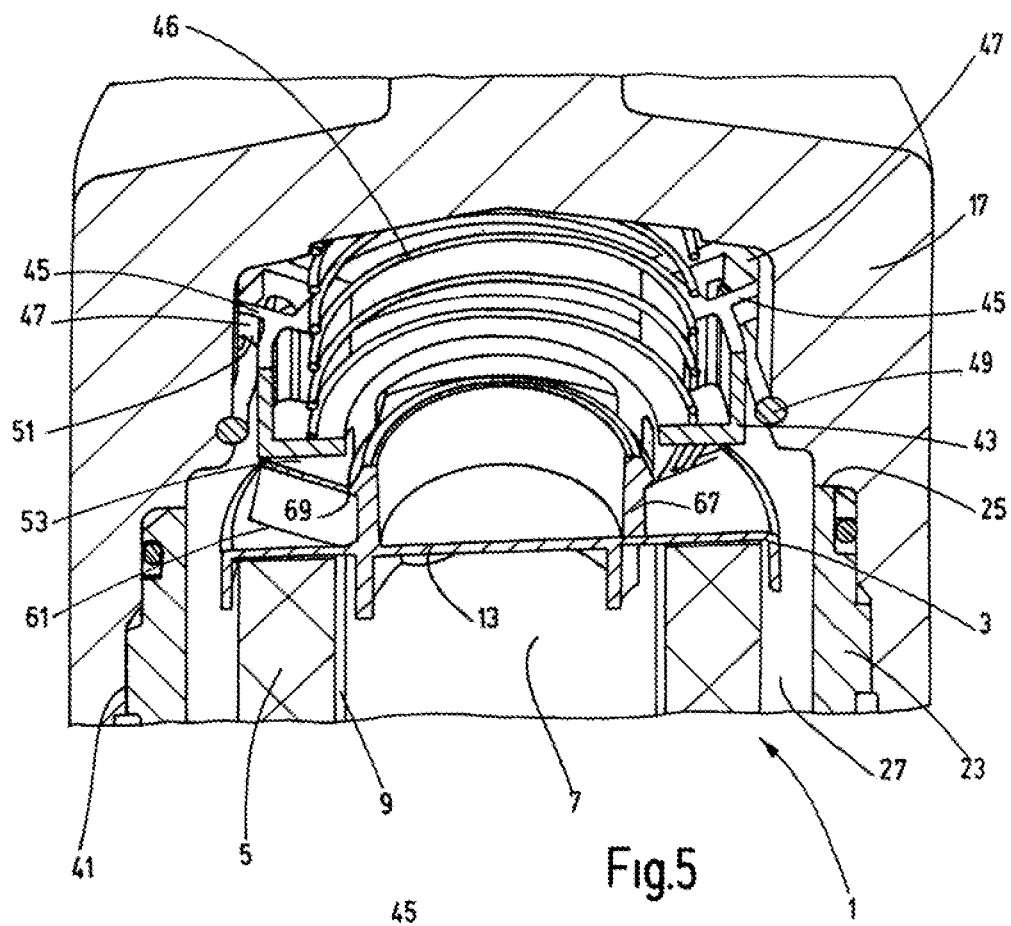
FIG. 5 is a partial perspective view in section drawn in broken lines of the upper end region of the closed filter housing of the exemplary embodiment, with a filter element in the operational position.

With respect to the housing parts of the filter housing holding the filter element 1, FIGS. 5 and 10 show a housing cover or head 17, and FIGS. 3 and 4 show the lower end portion of a housing body 19. At this housing body, a bottom part 21 forms the lower end of a cylindrical main part 23 of the housing body 19 receiving the filter element 1. The upper, open end 25 of the housing body can be closed by the removable housing head 17. It has a fluid inlet visible in FIG. 3, through which the fluid to be filtered flows during the filtering process into the space 27 between the outside of the filter medium 5 of the filter element 1 and the inner housing wall. The inlet is limited in this respect. The bottom part 21 has a discharge channel 29, which faces the inlet channel as shown in FIG. 3. for discharging the filtered fluid from the housing body 19.

The filter element 1 can be mounted in the housing body 19 of the filter housing by a screw or threaded connection. One threaded element is formed by a threaded connector 31, axially protruding into the housing main part 23, having an external thread 32. Connector 31 forms the mouth of the outflow channel 29 inside the housing, cf. FIGS. 3 and 4. The filter element 1 has an internal thread 33 as second threaded element that can be screwed or threaded on the threaded connector 31. It is located on the inside of a connecting piece 35 that surrounds the opening 15 on the lower end cap 11 of the filter element 1. The free end rim of the connection piece 35 forms a sealing surface 37. For a tightened screw connection, the seal is formed by pressing the sealing surface 37 on a contact surface 39 at the bottom part 21.

Figure 6:
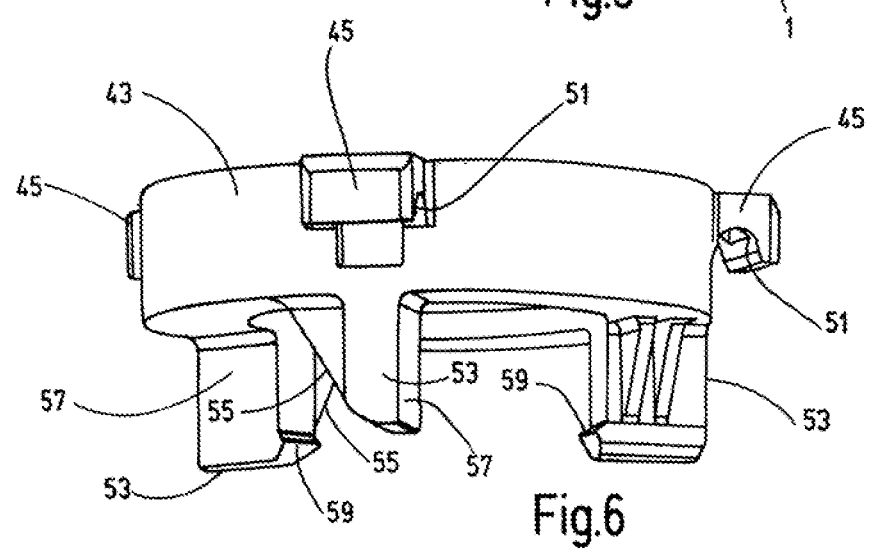
FIG. 6 is a perspective view, slightly enlarged relative to FIG. 5, of an annular driver element of the coupling device of the exemplary embodiment.

The housing head 17 can be attached to the housing body 19 by a second screw connection, which is formed by a threaded section 41 between the housing head 17 and the region of the housing main part 23 adjacent to the housing end 25. FIG. 5 shows the fully screwed-on or threaded-on state of the housing head 17. A coupling device transmits rotational movements of the housing head 17 to the filter element 1 during screwing or unscrewing the housing body 19 in order to tighten or loosen the screw connection formed between the filter element and the housing body 19. The coupling device has coupling parts, one of which is disposed secured against rotation within the housing head 17. The other coupling part is part of the facing upper end cap 3 of the filter element 1. The coupling part associated with the housing head 17 forms the drive-end coupling part in the transmission of rotational movements performed for screwing or unscrewing the housing head 17. The housing head coupling part is a driver element 43 provided in the form of an annular body. It has retaining hooks 45 radially projecting from its circular or circular cylinder outer side. Retaining hooks 45 are used to guide it non-rotatably and axially displaceably in axially extending recesses 47 in the inside of the housing head 17. For the axial movement in the direction of the open end of the filter head 17, the annular driving element 43 is pre-tensioned by a compression spring 46, but is held captive against a complete escape from the housing head 17 by a retaining device. The retaining device or retainer is formed in the exemplary embodiment by a snap ring 49 seated inside the housing head 17, over which snap ring the curved bottom 51 of the retaining hooks 45 can extend. As can be seen most clearly from FIG. 6, the annular driver element 43 has one axially protruding driver cam 53 each at the bottom side in FIG. 6 and oriented circumferentially towards each of the three retaining hooks 45. Every driver cam 53 has a contact chamfer 55 on one of its circumferentially facing sides and a limit stop 57 on its other, opposite circumferentially facing side. On the side facing the center of the annular driver element 43, each driver cam 53 also forms a latching projection 59 protruding radially inwards.

The other coupling part, which serves with respect to the rotational movements of the housing head 17 and the driver element 43 as the coupling part at the output side, as can be seen most clearly in FIG. 1, is formed by three coupling wedges 61. Coupling wedges 61 are arranged on the top side of the upper end cap 3 formed by the plate 13 in an axially protruding manner. Every coupling wedge 61 has a guide chamfer 63 on one circumferential side and an abutment surface 65 on the opposite circumferential side. As FIG. 1 also clearly shows, an axially projecting cylindrical part 67 is formed in the central region of the plate 13 of the end cap 3 between the coupling wedges 61. On the free end rim of cylindrical part 67, a rib-shaped, annular projection 69, protruding radially outward, is formed. The filter element 1 can be latched by this annular projection to latching projections 59 located at the drive cams 53 using the annular driving element 43, such that the filter element is secured to the driver element 43, but can be axially moved relative to the driver element 43 according to the height of the cylinder part 67.

The installation process to be performed for inserting a filter element 1 into the opened filter body 19 and to close the housing body 19 using the housing head 17 can be performed in the device according to the invention, such that the filter element 1 is secured to the housing head 17 by latching it to the driver element 43 and inserting it in the housing body 19. The housing head 17 is rotated for screwing the filter element onto the housing body 19, cf. FIG. 7, where this rotational movement is indicated by a rotary arrow 71. The driver cams 53 of the driver element 43, whose contact chamfer(s) 55 run against the guide chamfers 63 of the coupling wedges 61 under the action of the compression spring 46, transmit this rotational movement to the end cap 3 of the filter element 1, such that the filter element is screwed onto the threaded connector 31 on the bottom part 21 using the internal thread 33 of the lower end cap 11 until this screw connection reaches the tightened state. In this tightened state, the sealing surface 37 of the end cap 11 forming a sealing edge reaches the contact surface 39 of the bottom part 21 for sealing contact. Upon reaching this tightened state, in the case of further rotation of the housing head 17, the driver cams 53 run over the guide chamfers 63 on the coupling wedges 61 of the end cap 3, cf. FIG. 8, such that the coupling device, forming a spring-loaded ratchet coupling permits a further rotation of the housing head 17 for tightening the second screw connection between the housing head 17 and housing body 19. During the insertion of the filter element 1, in one single operation, the filter element 1 can be mounted by actuating the first screw connection on the threaded connector 31 in the housing body 19 and the filter housing can be closed by attaching the housing head 17. During disassembly and the resulting opposite rotational movement of the housing head 17, the coupling device, as shown in FIG. 9, acts as a rigid coupling, wherein the limit stops 57 resting against the abutment surfaces 65 of the coupling wedges 61 jointly rotate the filter element 1 for loosening the screw connection with the threaded connector 31. Upon further rotational movement, the second screw connection between the housing head 17 and housing body 19 becomes detachable, such that the filter element 1 to be replaced can be removed in conjunction with the filter head 17 and the disassembly process can also be performed in one operation.

By adjusting the spring stiffness of the compression spring 46, the tightening torque of the filter element 1 achievable for the overrunning the coupling parts can be adjusted such that any damage to the sealing edge on the sealing surface 37 is avoided. In the design of the threaded elements of the two screw connections, the pitch and the number of threads are designed such that the screw connection 32, 33 between the filter element 1 and the bottom part 21 of the housing body 19 is tightened or loosened before the second screw connection 41 between the housing head 17 and the housing body 19 is tightened or loosened. For example, in the illustrated exemplary embodiment, the first screw connection at the lower end cap 11 and at the threaded connector 31 is formed as a thread having a pitch of 4 with four turns, while a fine pitch between housing head 17 and housing body 19, having a pitch of 1.5 is formed with six turns.

While one embodiment has been chosen to illustrate the invention, it will be understood by those skilled in the art that various changes and modifications can be made therein without departing from the scope of the invention as defined in the claims.

The invention claimed is:

1. A filter device, comprising:
   filter housing having first and second housing parts releasably connected by a housing screw connection;
   a filter element accommodated in said filter housing and releasably connected to said first housing part by an element screw connection, said filter element having first and second end caps; and
   a coupling device connecting said filter element to said second housing part capable of transferring torque from said second housing part to said filter element to rotate said filter element with said second housing part and relative to said first housing part in a manner engaging said filter element with said element screw connection until said element screw connection is tightened and then allowing said second housing part to rotate relative to said filter element and said first housing part as said second housing part rotates relative to said first housing until said housing screw connection is tightened.

2. A filter device according to claim 1 wherein
   said first housing part comprises a housing pot having a pot threaded element forming a part of said element screw connection securing to said filter element to said housing pot; and
   said second housing part comprises a housing head with a head threaded element forming a part of said housing screw connection connecting said housing head to said housing pot.

3. A filter device according to claim 2 wherein
   said coupling device comprises a head coupling part being mounted in said housing head and being non-rotatable relative to said housing head, and comprises an element coupling part on said second end cap of said filter element, said housing head coupling part and said element coupling part being connectable, said head coupling part being movable in a coaxial direction of said housing screw connection and said element screw connection.

4. A filter device according to claim 3 wherein
   said head coupling part comprises a ring-shaped driver element having a projecting first driver web, said first driver web having a free end region with an obliquely extending contact element on one side thereof and a stop element on an opposite side thereof.

5. A filter device according to claim 3 wherein
   said element coupling part comprises a first coupling web having an obliquely extending guide element on one side thereof and an abutment surface on an opposite side thereof.

6. A filter device according to claim 4 wherein
   said ring-shaped driver element is biased by an energy storage in an axial direction of said housing and element screw connections toward said second end cap and is retained in said housing head by a holder in said housing head.

7. A filter device according to claim 6 wherein
   said energy storage is a compression spring.

8. A filter device according to claim 4 wherein
   said driver web carries an engagement projection on a side thereof facing a middle of said ring-shaped driver element, said second end cap being releasably connected to said ring-shaped driver element by a clip connection formed by said engagement projection subject to play.

9. A filter device according to claim 6 wherein
   said holder comprises a holding web being arranged on said ring-shaped driver element, projecting radially outwardly from said ring-shaped driver element and contacting a securing ring fixed in said housing head when biased by said energy storage to a maximum extension position of said ring-shaped driver element from said housing head.

10. A filter device according to claim 9 wherein
    said holding web extends into and is guided for movement in a cutout opening in said housing head securing said ring-shaped driver element against rotation in and relative to said housing head.

11. A filter device according to claim 5 wherein
    said head coupling part comprises a ring-shaped driver element having a projecting first driver web, said first driver web having a free end region with an obliquely extending contact element on one side thereof and a stop element on an opposite side thereof.

12. A filter device according to claim 11 wherein
    said ring-shaped driver element comprises second and third driver webs each having a free end region with an obliquely extending contact element on one side thereof and a stop element on an opposite side thereof; and
    said element coupling part comprises second and third coupling webs each having an obliquely extending guide element on one side thereof and an abutment surface on an opposite side thereof, each of said driver webs and said coupling webs extending axially parallel to and spaced circumferentially from one another about a longitudinal axis of said housing and element screw connections.

13. A filter device according to claim 2 wherein
    said pot threaded element comprises a threaded socket.

14. A filter device according to claim 13 wherein
    said housing screw connection and said element screw connection have threads differing in at least one of pitch or number of threads such that said filter element is secured to said threaded socket before said housing head is completely threaded on said housing pot.

15. A filter device according to claim 11 wherein
said obliquely extending contact element of said first drive web and said obliquely extending guide element of said first coupling web travel over one another as during connecting of said housing screw connection; and
said stop element of said first drive element and said abutment surface contact one another during unthreading of said element screw connection and said housing screw connection.

16. A filter device according to claim 11 wherein
said ring-shaped driver element is concentric with a longitudinal axis of said housing and element screw connections;
said first driver web and said first coupling web extend parallel to said longitudinal axis with obliquely extending contact element and said obliquely extending guide element lying in planes at angles to planes containing all of said longitudinal axis and with said stop element and said abutment surface lying in said planes containing all of said longitudinal axis.

17. A filter device according to claim 16 wherein
said ring-shaped driver element is biased by an energy storage in an axial direction of said housing and element screw connections toward said second end cap and is retained in said housing head by a holder in said housing head.

* * * * *